United States Patent
Bailey

[11] Patent Number: 5,928,616
[45] Date of Patent: Jul. 27, 1999

[54] METHOD OF SOLVENT EXTRACTION AND APPARATUS THEREFOR

[75] Inventor: Geoffrey Horrocks Bailey, Preston, United Kingdom

[73] Assignee: British Nuclear Fuels PLC, Warrington, United Kingdom

[21] Appl. No.: 08/445,016

[22] Filed: May 22, 1995

Related U.S. Application Data

[63] Continuation of application No. 08/124,626, Sep. 22, 1993, abandoned, which is a continuation of application No. 07/829,581, Feb. 3, 1992, abandoned, which is a continuation of application No. 07/341,805, Apr. 24, 1989, abandoned.

[30] Foreign Application Priority Data

May 18, 1988 [GB] United Kingdom .................... 8811785

[51] Int. Cl.⁶ ...................................................... B01D 11/04
[52] U.S. Cl. .............................. 422/256; 423/8; 210/194; 210/634; 210/511
[58] Field of Search ...................................... 422/256–259; 423/8; 210/194, 296, 511, 634

[56] References Cited

U.S. PATENT DOCUMENTS

| | | | |
|---|---|---|---|
| 3,711,591 | 1/1973 | Hurst et al. | 422/159 X |
| 3,959,435 | 5/1976 | Mills et al. | 423/10 |
| 4,028,462 | 6/1977 | Domic et al. | 210/634 X |
| 4,787,979 | 11/1988 | Kolarik et al. | 210/634 |
| 4,832,923 | 5/1989 | Lonie | 422/256 |

*Primary Examiner*—Lyle A. Alexander
*Attorney, Agent, or Firm*—D. Peter Hochberg; William H. Holt; William R. Hinds

[57] ABSTRACT

In a solvent extraction method a contactor comprises a forward extraction section comprising sub-sections thereof and a back extraction section comprising sub-sections thereof. To enable higher concentrations of solute to be obtained in the backwash liquor, the contactor is operated with recycle of partially-loaded solvent, via a line from a back extraction sub-section to a forward extraction sub-section.

11 Claims, 2 Drawing Sheets

METHOD OF SOLVENT EXTRACTION AND APPARATUS THEREFOR

This is a continuation of application Ser. No. 08/124,626 filed Sep. 22, 1993, now abandoned which is a continuation of application Ser. No. 07/829,581 filed Feb. 3, 1992, now abandoned, which is a continuation of application Ser. No. 07/341,805 filed Apr. 24, 1989, now abandoned.

This invention relates to a method of solvent extraction and apparatus therefor in the form of contactors of the kind having a forward extraction section for the selective extraction of a desired solute from a feed liquid, which may contain another solute or solutes, by means of an extractant liquid followed by extraction, in a back extraction section, of the desired solute from the solute-loaded extractant liquid into a backwash liquid which may be subsequently treated to recover the desired solute. The backwashed extractant liquid is recycled from the downstream end of the back extraction section to the upstream end of the forward extraction section. Such contactors are hereinafter referred to as "solvent extraction contactors of the kind specified". The terms "upstream" and "downstream" as used herein refer to the direction of flow of the extractant liquid through the forward and back extraction sections.

A typical application of such a contactor is in the processing of crude uranium ores to produce nuclear grade uranium. One stage in such processing involves the dissolution of the impure ores in nitric acid and purification to yield a substantially pure solution of uranyl nitrate which is then concentrated by evaporation for subsequent conversion to uranium tetrafluoride followed by reduction of the tetrafluoride to uranium metal. Purification is carried out using solvent extraction to transfer, in a forward extraction section, uranyl nitrate from an aqueous feed liquor of nitric acid containing the dissolved crude uranium ore into an organic extractant (usually tri-n-butyl phosphate in an odourless kerosene diluent). The organic extractant is subsequently contacted, in a back extraction section, with an aqueous backwash liquor such as dilute nitric acid to transfer the uranyl nitrate into the backwash liquor. In the forward extraction section, the conditions are adjusted so that the uranium transfers into the extractant leaving the impurities, present in the crude ore, in the feed liquor which is then termed the raffinate.

Following back extraction the organic extractant, now freed of uranyl nitrate, is recycled back to the forward extraction section. The uranyl nitrate-bearing backwash liquor is thereafter evaporated to concentrate the uranyl nitrate. Because of certain constraints imposed in conventional solvent extraction contactors, particularly in terms of the relationship between the McCabe-Thiele diagram equilibrium and operating lines, there is a limit on the uranyl nitrate concentration that can be attained in the backwash liquid. Evaporation is an energy-intensive and hence expensive process which means that it could be economically beneficial if it were feasible to achieve greater levels of concentration prior to evaporation, not only for recovery of uranium but for solvent extraction processes generally in circumstances where limits are imposed on the concentration of the desired solute in the backwash liquid.

According to one aspect of the present invention, in a solvent extraction contactor of the kind specified, a proportion of the extractant liquid is arranged to be recycled through a line to the forward extraction section from a location intermediate the upstream and downstream ends of the back extraction section.

Thus, in contrast with conventional solvent extraction contactors, part of the extractant liquid is recycled to the forward extraction section from the back extraction section so that extractant liquid which is still partially loaded with solute is recycled back to the forward extraction section. In other words, instead of recycling only extractant liquid which has been fully backwashed, as in conventional solvent extraction contactors, the recycled liquid comprises both fully backwashed and partially backwashed components. As will be described below, this has the effect of modifying the McCabe-Thiele diagram operating line in such a way that greater solute concentration in the backwash liquid can be achieved.

Preferably the recycled partially loaded extractant liquid is reintroduced into the forward extraction section at a location intermediate the upstream and downstream ends of the latter.

The forward and back extraction sections may comprise various types of solvent extraction equipment; for example each section may comprise a cascade of mixer-settler stages or each may comprise at least one solvent extraction column, such as a pulsed column.

Where the forward and back extraction stages each comprise a cascade of stages, the recycled partially loaded extractant liquid is derived from one of the cascade stages preceding, ie upstream of, the final stage of the back extraction cascade and is preferably reintroduced into a stage of the forward extraction cascade downstream of the first stage of the latter.

In the case where the forward and back extraction stages each comprise one or more extraction columns, the recycled partially-loaded extractant liquid may be obtained from a location intermediate the ends of the column (or one of the columns) and may be reintroduced into the forward extraction column (or one of the forward extraction columns) at a location intermediate the ends of the latter.

The forward extraction section may, if desired, be constituted by one type of contactor and the back extraction section by another. Conceivably each or either extraction system may comprise two or more different types of contactor.

The invention will now be described by way of example only with reference to the accompanying drawings in which:

BRIEF DESCRIPTION OF THE DRAWINGS

Referring now to FIG. 1, a conventional solvent extraction plant for the purification of uranium comprises a forward extraction (FX) section 10 and a back extraction (BX) section 12 each comprising a cascade of mixer-settler stages or other contacting equipment. A feed liquor comprising crude uranium ore dissolved in nitric acid is supplied at location 14 to the FX section 10 and is contacted with an organic solvent supplied at the upstream end 16 of the FX section so that uranyl nitrate present in the feed liquor phase is extracted into the solvent phase which typically comprises 20% tri-n-butyl phosphate (as extractant) in odourless kerosene (as diluent). The impurity-bearing feed liquor, depleted of uranyl nitrate, is removed at 18 as raffinate at the upstream end of the FX section 10 for subsequent treatment and disposal. The uranyl nitrate-bearing solvent is introduced (at 20) into the BX section 12 where it is backwashed with an aqueous phase comprising weak nitric acid which is supplied at point 22 at the downstream end of the BX section and is taken off at point 24 at the upstream end of the latter. As mentioned previously, all references to "downstream" and "upstream" are with reference to the direction of flow of the extractant.

The loaded backwash liquor is subsequently treated by evaporation to concentrate its uranium content. The backwashed solvent is taken off at the downstream end of the BX section and is recycled via the line 26 to the upstream end of the FX section for re-use. The above description is somewhat simplified and makes no reference to the use of a scrubbing section which in practice may be compounded with the FX section and is used to contact the organic phase passing the feed point 14 with fresh aqueous phase which serves to wash or scrub impurities from the organic phase. However, this is not germane to the present invention and will not therefore be described in detail except to mention that the aqueous scrub is introduced at point 28 at the downstream end of the FX section.

For efficient extraction particularly in terms of securing the production of a substantially uranium free raffinate, it is conventional practice to operate the BX section so that the solvent emerging at the downstream end is substantially freed of all of the desired solute, ie uranyl nitrate in the present example.

Figure 2:
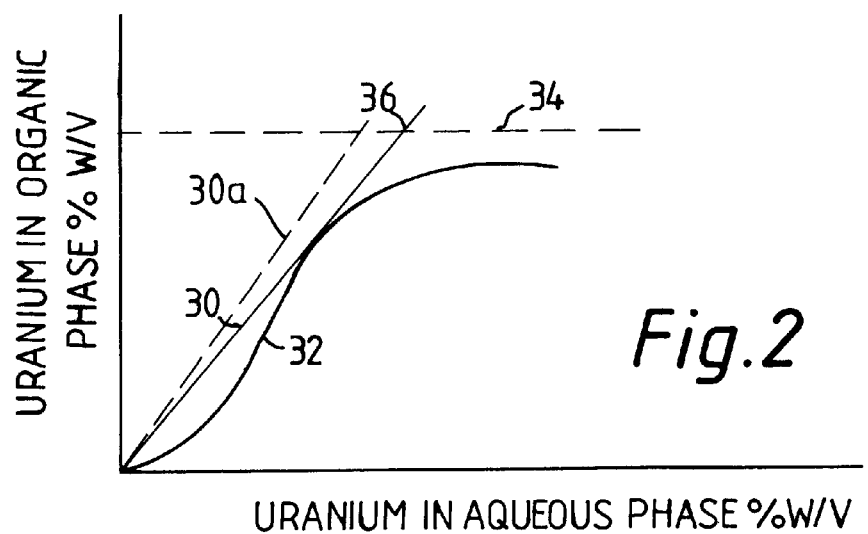
FIG. 2 is a McCabe-Thiele diagram showing the partition of uranium between the organic and aqueous phases of the back extraction section of the conventional plant shown in FIG. 1 and an operating line corresponding to the theoretical maximum product concentration.

Referring to FIG. 2, this shows a typical McCabe-Thiele diagram for the BX section. The operating line 30 (representing actual conditions in the BX section) must at all times be above the equilibrium line 32 and must pass approximately through the origin if satisfactory raffinate is to be achieved. The line 34 represents the maximum loading achievable for the solvent and the point 36 at which the operating line 30 intersects the line 34 represents the maximum concentration of uranium in the aqueous backwash liquor.

In FIG. 2, the operating line is shown tangential to the equilibrium line 32 as this is the condition which represents the theoretical maximum concentration. However, this would require an infinite number of theoretical stages in the contacting equipment; in practice, a compromise operating line is used which "stands off" from the equilibrium line to allow operation with a reasonable number of stages (or height of column etc). A compromise operating line is depicted by the phantom line 30*a* and it will be seen that this results in a lower uranium concentration in the aqueous phase.

Figure 1:
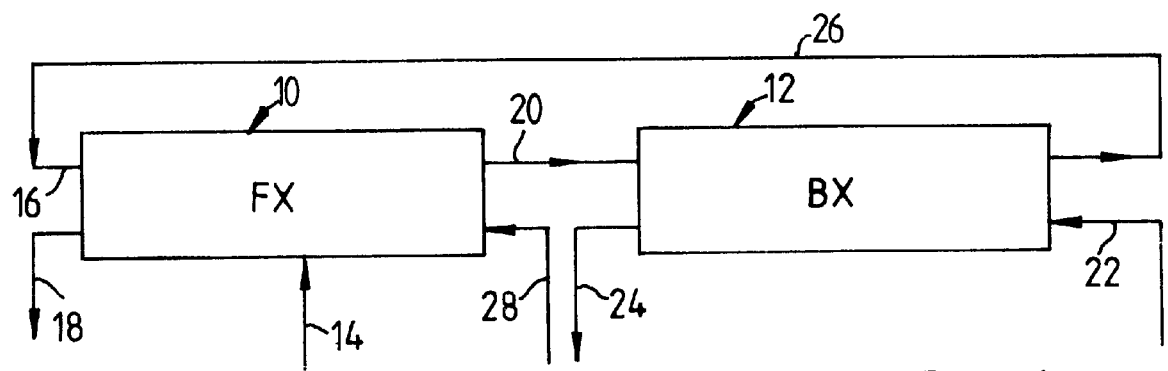
FIG. 1 is a simplified flowsheet for a solvent extraction plant as used conventionally in the purification of uranium ore concentrates.
Figure 3:
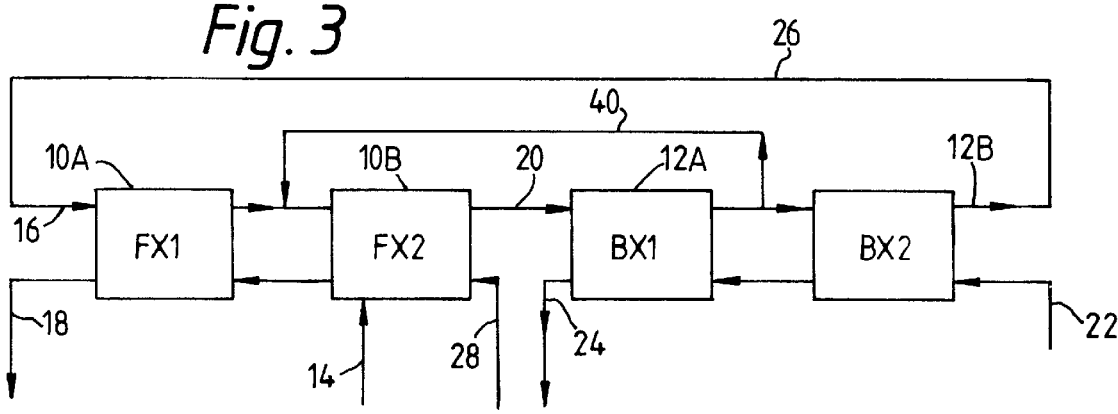
FIG. 3 is a simplified flowsheet for a solvent extraction plant in accordance with the present invention.
Figure 4:
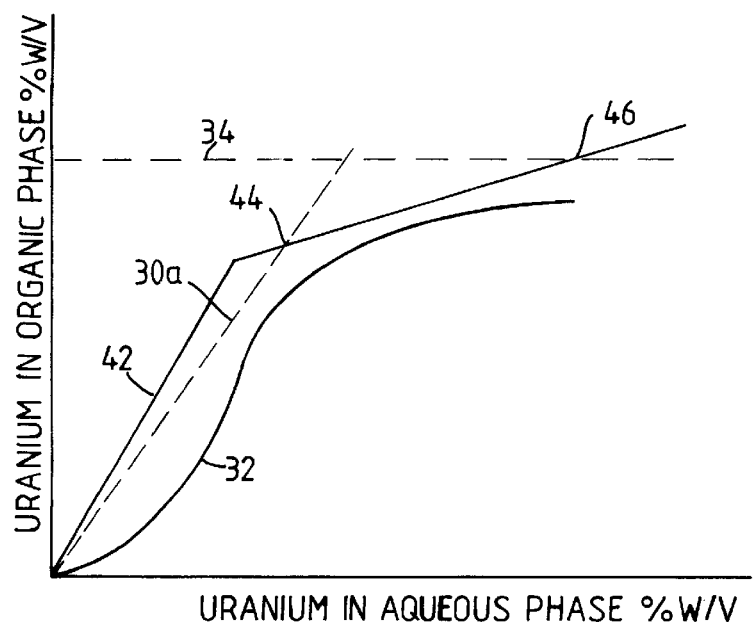
FIG. 4 is a McCabe-Thiele diagram similar to that of FIG. 2 but for the plant of FIG. 3.

Referring to FIG. 3 which shows a solvent extraction system according to the invention, the system of FIG. 1 is modified in that both the FX section and the BX section are in effect each divided into two sub-sections 10A, 10B, 12A, 12D and solvent is recycled via the line 40 from the downstream end of BX sub-section 12A to the upstream end of FX sub-section 10B. In FIG. 3, the same reference numerals are used to identify parts having similar functions to the parts shown in FIG. 1. The system of FIG. 3 will be seen to comprise one solvent extraction loop (viz sub-sections 10B, 12A and recycle 40) nested within another (viz sub-sections 10A, 12B and recycle 26). The solvent recycled via line 40 will not have been completely stripped of the desired solute and consequently the FX sub-section 10B is supplied with partially loaded solvent from BX sub-section 12A (and partially-loaded solvent from the FX sub-section 10A). Although the two extraction sections are illustrated in FIG. 3 as being two physically distinct sub-sections, this need not be the case. The arrangement whereby partially loaded solvent is tapped off at a point partway along the back extraction section and then re-introduced at a point partway along the forward extraction section in effect divides each section FX, BX into two sub-sections. By selection of the points in the BX section and FX section at which the partially loaded solvent is respectively taken off, via line 40, and reintroduced, the McCabe-Thiele diagram can be modified in the manner shown in FIG. 4. Thus, instead of a single operating line 30*a* as in FIG. 2, the system is effectively represented by a two-part operating line 42, 44 by virtue of the nesting of one solvent extraction loop within the other and the concentration of uranium in the aqueous phase obtained at point 24 can be increased, as indicated by the point of intersection 46 between the line 34 indicating maximum solvent loading and the operating line portion 44.

The selection of the solute-concentration in the recycled partially-loaded solvent will in general be governed by considerations such as the following:

(i) as the point of intersection of portions 42, 44 moves further away from the BX equilibrium line 32, the back extraction becomes easier (ie requires fewer theoretical stages) but the forward extraction becomes more difficult because the corresponding operating lines on the FX McCabe-Thiele plot move closer to the FX equilibrium line; and (ii) the product concentration (as indicated by point 46) can be increased by reducing the slope of line 44. This is equivalent to increasing the solvent (extractant) flow around the inner loop 40. Limitations of equipment sizing and complications in the scrub section however impose practical limits on the achievable concentrations.

As mentioned previously, the FX and BX sections may be constituted by various types of solvent extraction contactors such as mixer-settlers or pulsed columns. Thus, for example, in FIG. 3 the sub-sections 10A, 10B, 12A, 12B may each comprise a number of mixer-settler stages or one or more pulsed columns. Conceivably the sub-sections 10A, 10B and/or the sub-sections 12A, 12B may be constituted by a single FX column or BX column respectively, the recycle line 40 for example extending from an intermediate point along the length of the BX column to an intermediate point along the length of the FX column.

It will be appreciated that the invention is not restricted to only one solvent extraction loop being nested within another; it is envisaged that partially-loaded solvent may be recycled from more than one point along the BX section back to one or more points along the FX section to give the effect of multiple nesting of solvent extraction loops. In this way, the operating line of the system may be adjusted so that it comprises more than two portions of different slope.

It will also be understood that the invention includes in another aspect a method of solvent extraction in a solvent extraction contactor of the kind specified, the method comprising recycling to the forward extraction section a proportion of the extractant liquid from a location intermediate the upstream and downstream ends of the back extraction section.

I claim:

1. A solvent extractor contactor comprising:

a forward extraction section for the selective extraction of a desired solute from a feed liquid by contact with an extractant liquid, said forward extraction section having an upstream end and a downstream end wherein the extractant liquid is inputted into the upstream end, and being loaded with the desired solute in said forward extraction section and outputted through the downstream end, a back extraction section for extraction of the desired solute from the loaded extractant liquid into a backwash liquid, said back extraction section having an upstream end and a downstream end wherein said loaded solvent is received from the downstream end of said forward extraction section and inputted into the upstream end of said back extraction section, and recycling means for recycling fully backwashed extractant liquid from the downstream end of the back extraction section to the upstream end of the forward extraction section, the improvement comprising:

the forward extraction section being subdivided into a first forward subsection and a second forward subsection connected by a first liquid extractant flow line carrying liquid extraction partially loaded at said first forward subsection, the back extraction section being subdivided into a first back subsection and a second back subsection connected by a second liquid extraction flow line carrying liquid extractant partially backwashed at said first back subsection, and a recycle loop line being connected between the second liquid extractant flow line to the first liquid extractant flow line for combining the partially backwashed liquid extractant from the second flow line with the partially loaded liquid extractant from the first flow line.

2. A solvent extractor contactor as defined in claim 1, wherein the flow rate of the partially backwashed liquid extractant from the second flow line is greater than the flow rate of the partially loaded liquid extractant from the first flow line.

3. A solvent extractor contactor as defined in claim 1, wherein the subsections included in the recycle loop line are each subdivided into n number of additional subsections, and n–1 number of additional recycle loops nested one within the other and within the first recycle loop line are connected between respective additional subsections in the forward extraction section and the back extraction section so that liquid extractant partially loaded at one of the forward subsections combines with liquid extractant from partially backwashed at one of the back subsections.

4. A solvent extractor contactor as defined in claim 1, in which the forward extraction section and the back extraction section each comprises a cascade of mixer-settler stages.

5. A solvent extractor contactor as defined in claim 4, wherein each mixer settler stage in said cascade provides a respective additional subsection, and additional recycle loops being connected between corresponding mixer-settler stages in the forward extraction section and in the back extraction section so that liquid extractant partially loaded at one of the forward subsections combines with liquid extractant partiallybackwashed at one of the back subsections.

6. A solvent extractor contactor as defined in claim 1, in which the forward extraction section and the back extraction section each comprises at least one solvent extraction column.

7. A method of solvent extraction in a contactor in which a feed liquid containing a desired solute is fed to a forward extraction section of the contactor to contact an organic extractant solvent and load the organic extractant solvent with the solute, followed by extraction in a back extraction section of the contactor by contact of the loaded organic extractant solvent with an aqueous backwash liquid causing the organic extractant solvent to unload the solute into the aqueous backwash liquid, and the fully backwashed organic extractant solvent is recycled from the downstream end of the back extraction section to the upstream end of the forward extraction section, wherein the improvement comprises, recycling through a loop a portion of said organic extractant solvent, partially backwashed at the back extraction section, from a location intermediate the back extraction section to a location intermediate the forward extraction section, so as to combine the flow of organic solvent partially backwashed at the back extraction section with the organic solvent partially loaded in the forward extraction section in a location intermediate to the forward extraction section.

8. A method of solvent extraction in a contactor defined in claim 7, wherein the flow rate of the partially backwashed liquid extractant is greater than the flow rate of the partially loaded liquid extractant.

9. A method as defined in claim 7, wherein a plurality of partially backwashed organic extractant solvent portions are recycled through a corresponding plurality of loops, each of said loops connected to a respective intermediate location at the back extraction section and at an intermediate location at the forward extraction section for combining organic extractant solvent partially loaded at the forward section with organic extractant solvent partially backwashed at the back extraction section.

10. A method as defined in claim 7 wherein the feed liquid comprised uranyl nitrate, the extractant solvent comprises tri-n-butyl phoshphate in an odorless kerosene diluent, and the aqueous backwash liquid comprised dilute nitric acid.

11. A solvent extractor contractor comprising:

a forward extraction section for the selective extraction of a desired solute from a feed liquid by contact with an extractant liquid, said forward extraction section having an upstream end and a downstream end wherein the extractant liquid is inputted into the upstream end, and being loaded with the desired solute in said forward extraction section and outputted through the downstream end;

a back extraction section for extraction of the desired solute from the loaded extractant liquid into a backwash liquid, said back extraction section having an upstream end and a downstreamn end wherein said loaded solvent is received from the downstream end of said forward extraction section and inputted into the upstream end of said back extraction section; and recycling means for recycling fully backwashed extractant liquid from the downstream end of the back extraction section to the upstream end of the forward extraction section, the improvement comprising:

the forward extraction section having a partway portion between the upstream end and the downstream end downstream end to effectively divide the forward extraction section into a first forward subsection and a second forward subsectlon;

the back extraction section having a partway portion between the upstream end the downstream end to effectively divide the back extraction section into a first back subsection and a second back subsection; and a second flow line for tapping the partway portion of the back extraction section for tapping partially loaded solvent extraction liquid from the partway portion of the back extraction section and for reintroducing the partially loaded solvent extraction liquid into the partway portion of the front extraction section for combining the partially loaded liquid extractant.

* * * * *